(12) United States Patent
Basnayake et al.

(10) Patent No.: US 9,354,322 B2
(45) Date of Patent: May 31, 2016

(54) CONFIGURING GLOBAL NAVIGATION SATELLITE SYSTEM RECEIVER UNITS VIA OVER-THE-AIR COMMUNICATIONS WITH CONTROL CENTER

(71) Applicant: General Motors LLC, Detroit, MI (US)

(72) Inventors: Chaminda Basnayake, Windsor (CA); Curtis Hay, West Bloomfield, MI (US); Eray Yasan, Canton, MI (US)

(73) Assignee: General Motors LLC, Detroit, MI (US)

(*) Notice: Subject to any disclaimer, the term of this patent is extended or adjusted under 35 U.S.C. 154(b) by 453 days.

(21) Appl. No.: 13/894,959

(22) Filed: May 15, 2013

(65) Prior Publication Data

US 2014/0340257 A1  Nov. 20, 2014

(51) Int. Cl.
| | |
|---|---|
| *G01S 19/03* | (2010.01) |
| *G01S 19/37* | (2010.01) |
| *G01S 19/14* | (2010.01) |
| *G01S 19/05* | (2010.01) |
| *G01S 19/13* | (2010.01) |
| *G01S 19/42* | (2010.01) |

(52) U.S. Cl.
CPC .................. *G01S 19/37* (2013.01); *G01S 19/03* (2013.01); *G01S 19/05* (2013.01); *G01S 19/13* (2013.01); *G01S 19/14* (2013.01); *G01S 19/42* (2013.01)

(58) Field of Classification Search
CPC ......... G01S 19/03; G01S 19/14; G01S 19/05; G01S 19/40
USPC ................ 342/357.4, 357.52, 357.42, 357.23
See application file for complete search history.

(56) References Cited

U.S. PATENT DOCUMENTS

| | | | |
|---|---|---|---|
| 2005/0065725 A1* | 3/2005 | Jeon ........................ | G01S 19/14 701/469 |
| 2007/0049287 A1* | 3/2007 | Dunn ................ | H04M 1/72536 455/456.1 |

(Continued)

FOREIGN PATENT DOCUMENTS

| | | | |
|---|---|---|---|
| CN | 102176039 A | * | 9/2011 |
| CN | 102890280 A | | 1/2013 |

OTHER PUBLICATIONS

State Intellectual Property Office of China, Office Action in co-pending Chinese Application No. 201410204433.9 dated Mar. 3, 2016.

*Primary Examiner* — Harry Liu
(74) *Attorney, Agent, or Firm* — Leydig, Voit & Mayer, Ltd.

(57) ABSTRACT

A telematics unit incorporating an antenna for receiving Global Navigation Satellite System (GNSS) signals from GNSS signal sources, and a GNSS receiver supporting over-the-air configuration is described herein. The telematics unit is configured with a processor and a non-transitory computer-readable medium including computer-executable instructions for facilitating the over-the-air configuration of the GNSS receiver by acquiring GNSS status information relating to multiple supported GNSS signal sources. Thereafter, the telematics unit forwards GNSS selection information, including at least GNSS requirements information and the GNSS status information, to a GNSS control center. In response, the GNSS receiver receives a GNSS type selection notification message from the GNSS control center. The GNSS receiver applies information contained within the GNSS type selection notification to configure GNSS type-specific components to operate according to a GNSS type-specific mode.

20 Claims, 4 Drawing Sheets

(56) References Cited

U.S. PATENT DOCUMENTS

| | | | | |
|---|---|---|---|---|
| 2009/0253440 A1* | 10/2009 | Edge | G01S 5/0018 | 455/456.2 |
| 2009/0325611 A1* | 12/2009 | Halivaara | G01S 19/05 | 455/466 |
| 2010/0060518 A1* | 3/2010 | Bar-Sever | G01S 19/27 | 342/357.66 |
| 2011/0140960 A1* | 6/2011 | Wirola | G01S 5/0063 | 342/357.42 |
| 2011/0144911 A1* | 6/2011 | Madhavan | G01C 21/00 | 701/472 |
| 2013/0017840 A1* | 1/2013 | Moeglein | G01S 19/25 | 455/456.1 |
| 2013/0054134 A1* | 2/2013 | Wang | G01C 21/3484 | 701/424 |
| 2013/0158853 A1* | 6/2013 | Li | G08G 1/143 | 701/400 |
| 2013/0162468 A1* | 6/2013 | Kim | G01S 19/42 | 342/357.25 |

* cited by examiner

| Parameters Provided By Telematics Unit to GNSS Configuration Manager |
|---|
| Minimum Accuracy 400 |
| Region of Operation 410 |
| Environment Type 420 |
| Vehicle Operating Mode 430 |
| System Capabilities 440 |
| GNSS Signal Observation Anomalies 450 |

FIG. 4

| Parameters Provided By GNSS Signal Sources To GNSS Configuration Manager |
|---|
| Satellite Status (Long term) 500 |
| Satellite Status (Short term) 510 |
| Signal Quality Indicators 520 |
| User Range Accuracy 530 |

FIG. 5

| Parameters Provided By GNSS Configuration Manager to Telematics Units |
|---|
| Selected GNSS System 600 |
| Selected GNSS Signal 610 |
| Allocated GNSS receiver resources 620 |
| Correction Instructions 630 |
| Measurement Selection and Relative Weights 640 |
| Filtering Mode 650 |

CONFIGURING GLOBAL NAVIGATION SATELLITE SYSTEM RECEIVER UNITS VIA OVER-THE-AIR COMMUNICATIONS WITH CONTROL CENTER

FIELD

The present disclosure relates generally telematics systems and more particularly to navigation systems and associated telematics services provided by a communications center provided via mobile wireless network connections to enhance navigation system services and functionality.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide a subscriber with telematics services such as those described herein.

One telematics service provided by TSPs is a Global Navigation Satellite System (GNSS) based navigation service. GNSS is a generic term referring to any of multiple satellite constellation-based global positioning networks including, for example, the Global Positioning System (GPS) constellation. Another GNSS constellation network is the Global Navigation Satellite System (GLONASS). A particular example of a GNSS based navigation service is one providing turn-by-turn (TBT) directions to a telematics unit based upon a specified destination and current conditions including the current location of the telematics unit. Several other GNSS systems are currently under development and are capable of providing at least partial positioning functionality.

The above body of information is provided for the convenience of the reader. The foregoing describes a suitable environment for which the described system and method are provided, and is not an attempt to review or catalog the prior art.

BRIEF SUMMARY

A system and method are described herein for configuring a GNSS receiver to operate using a selected subset of the multiple available GNSS constellations and associated instructions. In particular, described embodiments operate by dynamically configuring system components to use either one of the GPS and GLONASS subsets of GNSS.

In particular, the system in method are embodied in a telematics unit incorporating an antenna for receiving Global Navigation Satellite System (GNSS) signals from GNSS signal sources, and a GNSS receiver supporting over-the-air configuration is described herein. The telematics unit is configured with a processor and a non-transitory computer-readable medium including computer-executable instructions for facilitating the over-the-air configuration of the GNSS receiver by acquiring GNSS status information relating to multiple supported GNSS signal sources. Thereafter, the telematics unit forwards GNSS selection information, including at least GNSS requirements information and the GNSS status information, to a GNSS control center. In response, the GNSS receiver receives a GNSS type selection notification message from the GNSS control center. The GNSS receiver applies information contained within the GNSS type selection notification to configure GNSS type-specific components to operate according to a GNSS type-specific mode.

In a further implementation, the present invention is implemented as computer-executable instructions stored on a tangible, non-transitory computer-readable medium that is part of a telematics unit.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and the environment wherein the invention may be used, a brief overview is given to guide the reader. In general terms, not intended to limit the claims, a system and method are described herein for over-the-air configuration of a GNSS based navigation system integrated with/within a telematics unit. It will be appreciated that the principles described herein are not limited to vehicles, but are particularly applicable to apparatuses including a telematics unit having an integrated geographic location positioning subsystem such as, for example, a Global Navigation Satellite System (GNSS) receiver capable of selectively receiving/processing GNSS signals from multiple GNSS constellations and regional systems. Examples of potentially selectable constellations include GPS, GLONASS and regional systems. Examples of regional systems include QZSS of Japan and GAGAN. An example operating environment including multiple available sources of GNSS signal sources selectable for configuration for North America may include the combination of GPS, GLONASS and the regional geostationary Wide Area Augmentation System (WAAS) satellite signals. Exemplary systems are also equipped to include a mobile wireless communication device capable of communicating to a GNSS control center (described herein below with reference to FIG. 3) via mobile wireless communications.

In general, the illustrative examples described herein pertain to facilitating over-the-air (via a mobile wireless connection) configuration of a GNSS receiver (also referred to herein as a GNSS component) to utilize a designated one of multiple available GNSS constellations as a signal source for determining a current location of the GNSS receiver. In accordance with illustrative examples, the GNSS receiver is configured over-the-air via configuration instructions provided by a GNSS control center associated with, for example, a telematics service provider. The GNSS control center determines which one of multiple GNSS constellations is appropriate for a particular GNSS receiver instance/location based upon information provided by: the GNSS receiver and/or the various available GNSS signal sources (e.g. GNSS constellations and geostationary regional GNSS signal providers). Thus, the GNSS control center is able to render configuration (constellation) selections for GNSS receivers based upon specific conditions and/or application requirements for the GNSS receivers as well as current GNSS signal quality/availability of particular GNSS constellations.

Figure 1:
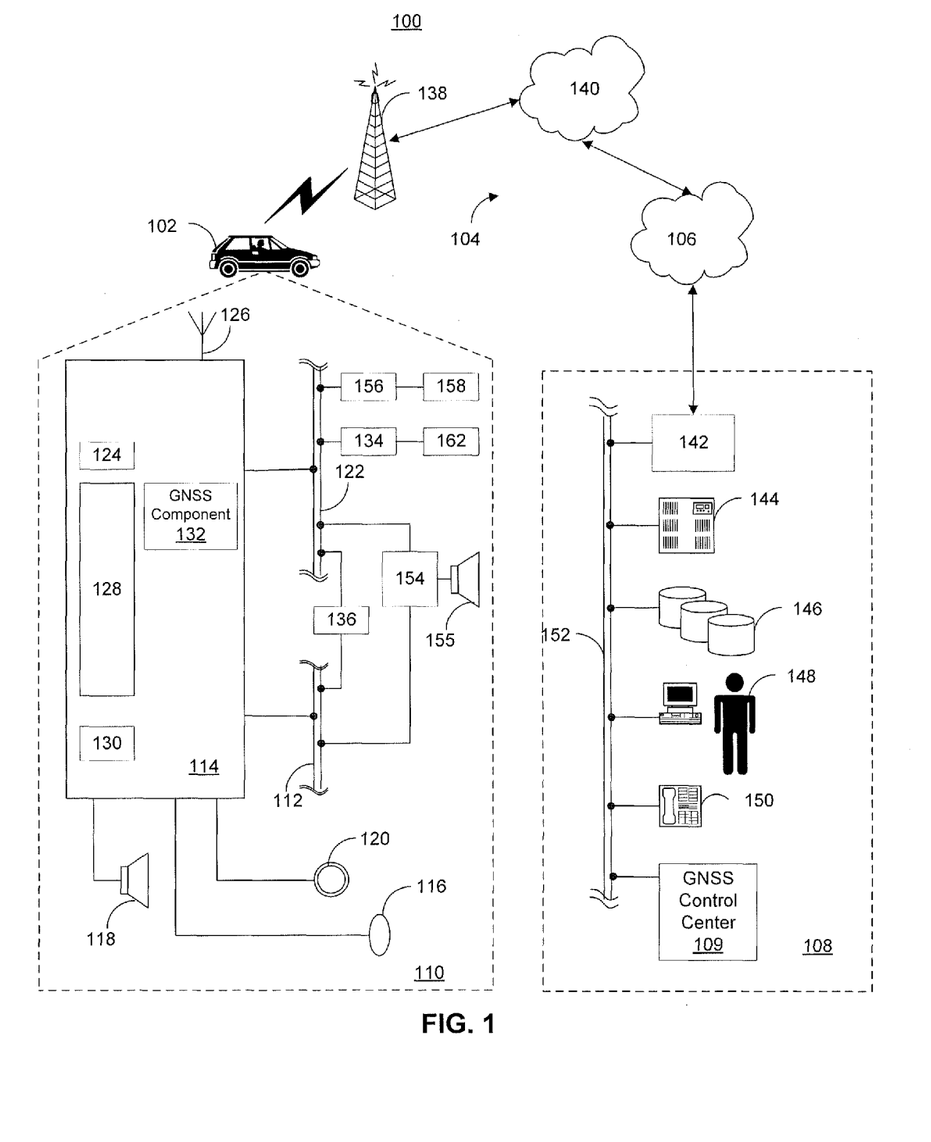
FIG. 1 is a schematic diagram of an operating environment for a mobile vehicle communication system usable in implementations of the described principles.

An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes-a GNSS control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, dedicated or a multifunction antenna 126 (combination of GNSS,mobile wireless signal, AM/FM), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component 132.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSC 140 includes a remote data server.

As appreciated by those skilled in the art, the mobile wireless network system includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
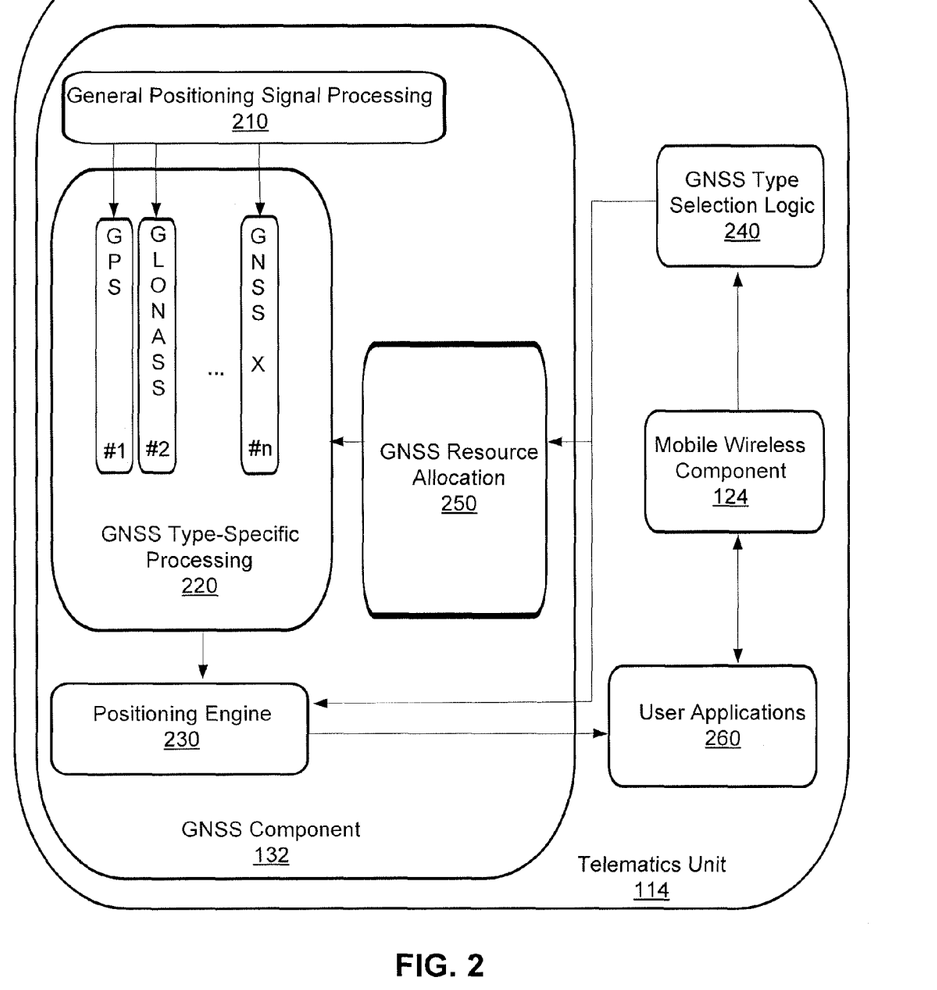
FIG. 2 is a functional block diagram identifying functional components of a telematics unit incorporating a GNSS receiver/component configured to provide GNSS map/navigation services via a selectable subset of multiple available GNSS constellations (e.g., GNSS and GPS)

With further reference to the architecture of FIG. 1, and turning more specifically to FIG. 2, a set of functional components for carrying out the GNSS component 132 and mobile wireless component 124 of the telematics unit 114 are illustratively depicted. The depicted components are operatively connected to the dual function antenna 126 depicted in FIG. 1, to facilitate receiving GNSS constellation signals and to communicate via the mobile wireless network system 104 with the GNSS control center 109 of the communications center 108.

Turning to FIG. 2, a set of functional components are depicted that are associated with the GNSS component 132 incorporated into the telematics unit 114. In the illustrative example, the GNSS component 132 is configured to support processing positioning signals provided by an extensible set of GNSS constellations. Such signals are initially received by the dual function antenna 126 (see, FIG. 1). A general positioning signal processing module 210 receives and processes all signals from the dual function antenna in a general positioning signal frequency band (e.g., L1). Thereafter, depending upon a current configuration of the GNSS component 132, the general positioning signal processing module 210 directs the partially processed positioning signal to a particular one of a set of GNSS type-specific processing modules 220. In the illustrative example, GPS and GLONASS are specifically identified in the set of GNSS type-specific processing modules 220. However, the set of modules 220 is extensible to accommodate additional positioning signal types—even non-GNSS signal types such as terrestrial-based positioning system signals. The individual modules of the set of GNSS type-specific processing modules 220 receive the partially processed signal provided by the general positioning signal processing module 210. After further processing by one of the type-specific processing modules 220, the GNSS type-specific information is passed to a positioning engine 230.

The positioning engine 230 decodes the GNSS system type-specific information received from the type-specific processing modules 220 in accordance with a currently selected GNSS constellation selection specified by a GNSS type selection logic module 240. The resulting geospatial location information is provided by the positioning engine 230 to one or more user applications 260 with suitable messaging interfaces for receiving and applying the provided geospatial location information. An example of such application is a navigation assistance application including map displays indicating a current user location and related navigation information (e.g., turn-by-turn instructions, distance, time of arrival) for a specified destination. In addition to position information, the positioning engine 230 is also configured to provide a variety of GNSS-related information. For example, in an illustrative example, the GNSS Component 132 periodically polls each of the various supported GNSS constellations to determine signal strength/quality and reports this information to the GNSS Control Center 109 via one of the user applications 260 and the mobile wireless component 124. Thus, the GNSS Control Center 109 is a potential resource for aiding selection of particular GNSS constellations for particular geospatial locations based upon information provided regularly from a large number of telematics units.

It is further noted that GNSS type selection logic module 240 also provides the current GNSS constellation selection to a GNSS Resource Allocation module 250 that is responsible for allocating processing resources within the GNSS component 132 for processing received GNSS signals based upon a current GNSS constellation selection. In addition, the GNSS Resource Allocation module 250 selects one of the modules within the GNSS system type-specific processing modules 220 to receive and process the partially processed signal rendered by the general positioning signal processing module 210.

The GNSS type selection logic module 240 is configured to render a current selection from the set of GNSS type-specific processing modules 220 supported by the GNSS component 132. By way of example, the selection logic module receives GNSS constellation selection instructions from the GNSS Control Center 109 via an interface to the mobile wireless component 124. The constellation selection instructions are potentially provided in any of multiple instruction forms. Such forms include, for example, an explicit instruction to use a particular GNSS constellation, a prioritized listing of GNSS constellations, information regarding signal quality and availability for particular GNSS constellations, etc. Thus, the complexity of the decision logic incorporated within the GNSS type selection logic module 240 can vary.

A wide variety of GNSS constellation selection schemes are contemplated. For example, a particular GNSS constellation is selected based solely upon a current location or indicated destination location of the telematics unit 114. Yet another selection scheme involves actively selecting a GNSS constellation based upon information (e.g., poor signal currently being provided by a particular constellation at particular location) received from the communications center 109 via the mobile wireless component 124. The described configurations thus support actively responding to current conditions through coordinated decision-making facilitated by communications between the telematics unit 114 and the communications center 109 via the mobile wireless component 124. Such decision making may also incorporate knowledge of currently running ones of the user applications 260 (i.e., application requirement-driven GNSS constellation selections). By way of example, if an application is providing route guidance to a user, it may be sufficient to configure the GNSS component 132 to use a GNSS signal source that delivers best performance by the route guidance application when using a GNSS signal source providing meter-level accuracy. However, if the application provides guidance at a higher level of precision and accuracy, e.g. the application supports ramp or merge identification and guidance, the GNSS component 132 may need to be configured to operate in a mode that provides the best accuracy possible at a sub-meter level of precision and accuracy.

Figure 3:
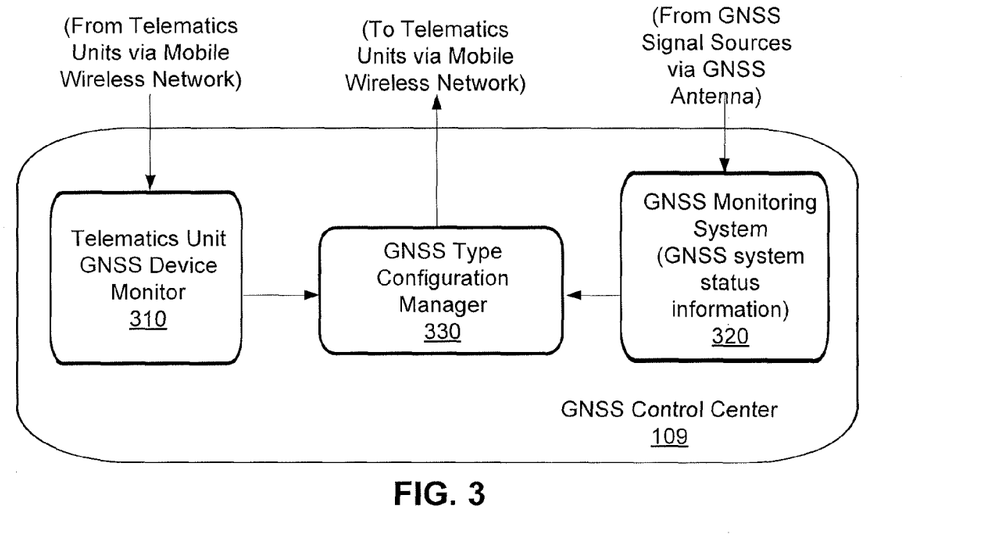
FIG. 3 is a functional block diagram identifying functional components of a GNSS control center relating to providing GNSS map/navigation services to GNSS receivers including parameter values facilitating selection/configuration of, for a particular GNSS receiver, a selectable one of multiple GNSS signal sources.

Turning to FIG. 3, functional components of the GNSS control center 109 are illustratively depicted. A telematics unit GNSS device monitor 310 is configured to receive and store a variety of GNSS status parameter values received from telematics units for a variety of subscribers to a TPS. See FIG. 4, described herein below. The GNSS status information provided by the various telematics units containing GNSS components enables creating/maintaining a geospatially segmented status map indicating operating conditions for a variety of GNSS constellations. The process of acquiring such information is enhanced by leveraging the distributed sensor network functionality created by subscriber devices operating as GNSS status information acquisition agents.

With continued reference to FIG. 3, a GNSS monitoring system 320 is configured to receive and store a variety of GNSS status parameter values received directly via a GNSS antenna (not shown) coupled (directly or indirectly) to the GNSS control center. See FIG. 5, described herein below. The GNSS monitoring system 320, in contrast to the GNSS device monitor 310 functionality, receives status information that is acquired and supplied by the GNSS signal sources. Such information includes, for example, identifications of currently non-operational constellation components (e.g., satellites).

Continuing with the description of FIG. 3, a GNSS type configuration manager 330 receives the GNSS-related status information maintained by the telematics unit GNSS device monitor 310 and the GNSS monitoring system 320. The GNSS type confirmation manager 330 issues configuration notifications to the telematics units to support configuration of the GNSS components, such as GNSS component 132, based upon one or more of: current GNSS constellation status information, application requirements of particular telematics units, current location of particular telematics units, etc.

Figure 4:
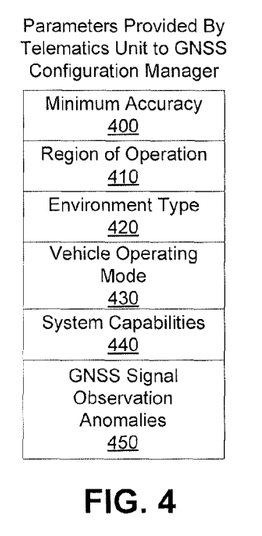
FIG. 4 is an exemplary set of GNSS parameters maintained/provided by GNSS components incorporated into a telematics unit to the GNSS control center to facilitate over-the-air configuration of the GNSS component to use a specified one of multiple GNSS constellations.

FIG. 4 summarizes an exemplary set of parameters GNSS maintained and provided by GNSS components to the GNSS control center 109, including the GNSS Type Configuration Manager 330, to facilitate over-the-air configuration of a GNSS component to use a specified one of multiple available GNSS geospatial positioning signal providers (e.g., GNSS constellations, regional geostationary signal providers, etc.). A minimum accuracy 400 specifies a required accuracy (and implicitly precision) needed by an application operating on the telematics unit 114. For example, a turn-by-turn navigation application incorporated into the telematics unit 114 need only receive geospatial position information with sufficient accuracy to correlate the geospatial information with stored street/road paths and intersections. However, a greater level of accuracy (and precision) is needed by an application that aids/provides actual vehicle guidance, such as an application that senses when a car is traveling on a wrong side of a road or wrong lane. The minimum accuracy 400 thus ensures that during selection of a particular GNSS geospatial positioning signal provider from a set of potential providers.

A region of operation 410 indicates a general global location within which the telematics unit 114 is currently operating. The region of operation 410 differs from actual position coordinates in that a general location (e.g., a country) identifier is specified to facilitate selecting a potentially region-limited desired GNSS geospatial positioning signal provider. Providing the region of operation identification to the GNSS configuration manager 330 enables selection, by the GNSS type configuration manager 330, of an appropriate regional system that may be more appropriate for a particular requesting application than the always available global systems.

An environment type 420 specifies a unique operating condition that may require disqualification of an otherwise suitable GNSS geospatial positioning signal provider due to signal shielding/interference arising from the particular operating environment. By way of example, potentially specifiable environment types include: open sky, overhead tree cover, urban canyon, limited view of sky, and no direct sky visibility/reflections, covered driving/parking facility, etc.

A vehicle operating mode 430 specifies a current type of driving mode of the vehicle containing the telematics unit 114. Examples of vehicle operating modes include: highway, off-road, urban, etc.

A system capabilities 440 specifies signal configurations/types supported by the signal receiver associated with the telematics unit 114. Examples of system capabilities specified include fields/codes indicating: number of receiver channels, receiver frequency bands, etc. Such capabilities/limitations may disqualify certain GNSS geospatial position information signal providers that do not transmit in one of the frequency bands supported by the receiver.

An observation anomalies 450 carries out an extensible catch-all function with regard to the specification of particular conditions/requirements/capabilities specified by the telematics unit 114. Examples of observation anomalies include large range, frequency measurement errors and Doppler shift measurement errors. In general, the observation anomalies 450 are intended to report current problems experienced by the GNSS component 132 of the telematics unit 114—problems that may be alleviated by selection of a particular one of multiple available GNSS geospatial position information signal providers.

Figure 5:
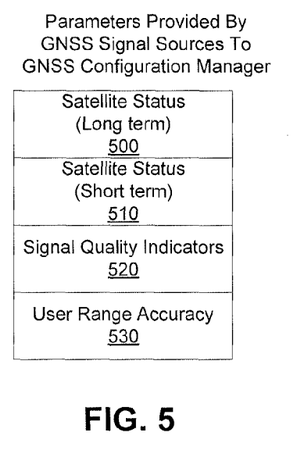
FIG. 5 is an exemplary set of parameters provided by GNSS constellations and maintained on the GNSS control center to facilitate configuring a telematics unit to use a particular one of the multiple GNSS constellations.

FIG. 5 summarizes an exemplary set of parameters provided by different GNSS signal sources and maintained on the GNSS control center 109 to facilitate configuring the telematics unit 114 to use a particular one of the multiple GNSS signal sources. Long-term satellite status 500 specifies a current satellite status on an individual satellite basis. This status is identified as long term as this information is applicable for a relatively long duration compared to certain other parameters and may take longer to update to the current status. Examples of potential reported satellite statuses include: available, unavailable, partially available (limited operational modes). An example of long term status is the Health status given in The GPS Almanac which indicates whether or not the satellite is usable for general navigation. A Short-term satellite status 510 includes satellite status parameters that are updated with very low latency. By way of example, the Wide Area Augmentation System (WAAS) has a Time-to-Alert (TTA) satellite reporting requirement of several seconds which results in substantially real-time satellite status information regarding the reported status parameters. A signal quality indicators 520 include information such as signal power levels that provide an indirect measure of the signal quality. A User Range Accuracy 530 provides a parameter value available from GNSS satellites that gives an estimated ranging accuracy for a given satellite and a signal. A GNSS receiver may be configured to use the ranging accuracy information and knowledge of the satellite geometry it sees to derive an estimate of the position accuracy. In addition to the above-discussed parameter values, GNSS signal source information can also include System Integrity Information.

Figure 6:
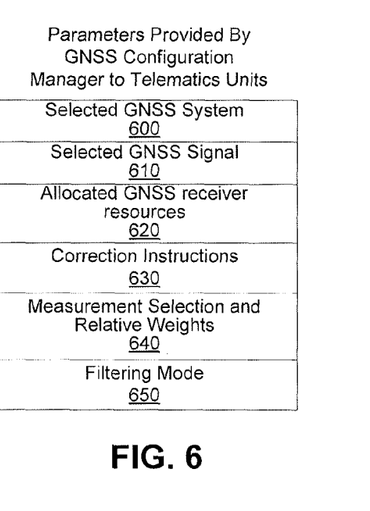
FIG. 6 is an exemplary set of parameters provided by the GNSS control center to telematics units in association with over-the-air configuration of the GNSS component to utilize a particular one of the multiple GNSS constellations.

FIG. 6 summarizes an exemplary set of parameters provided by the GNSS control center to telematics units in association with over-the-air configuration of the GNSS component to utilize a particular one of the multiple GNSS signal sources. A selected GNSS system 600 identifies a particular system or systems that should be used by the telematics unit 114 and/or particular application running on the telematics unit 114 that will be using the subsequently received geospatial positioning information from the identified GNSS system. A selected GNSS system 610 identifies a particular signal (if multiple signal types are provided by the system designated in the selected GNSS system 600) that should be used by the telematics unit 114 and/or the particular applications running on the telematics unit 114. An allocated GNSS receiver resources 620 specifies various functional components of a GNSS component 132 of the telematics unit 114 that are needed to receive signals from the specified GNSS signal source in the selected GNSS system 600. Examples of receiver resources include channels used by the GNSS signal source for transmitting signals to configured receivers. Correction instructions 630 specify whether and what type of corrections need to be made to a GNSS signal source. A measurement selection and relative weights 640 provides signal measurement mode and processing instructions. For example, fields within the measurement selection and relative weights 640 specify whether signals from two frequencies are to be combined (and weight applied to each when combined). Additionally, the measurement selection and relative weights 640 specifies signal processing modes such as Doppler processing. A filtering mode 650 specifies a type of filtering to be performed by the GNSS component 132 as well as filter configuration parameters. An example of a designated filtering mode is Kalman filtering.

Figure 7:
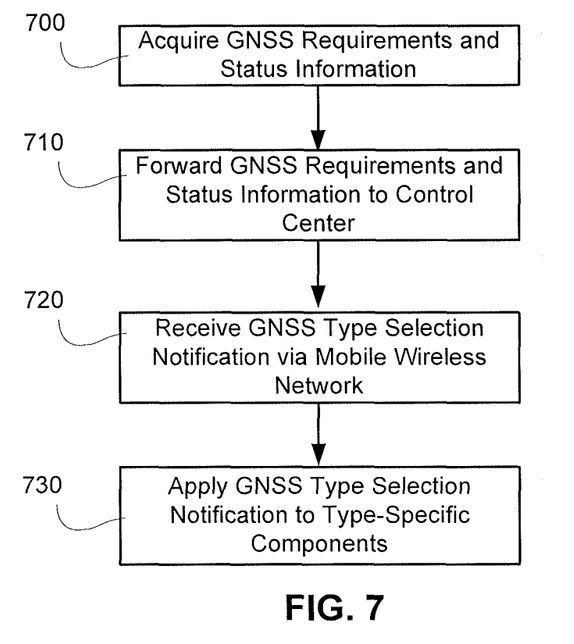
FIG. 7 is a flowchart illustrating a process implemented on GNSS receivers for selecting one of multiple available GNSS constellations for use with a GNSS map/navigation service supported by a TPS.

FIG. 7 is a flowchart summarizing a set of operations performed, in potentially any order and multiple times, by the telematics unit 114 including the GNSS component 132 for selecting one of multiple available GNSS signal sources (e.g. GNSS constellations) for use with a GNSS map/navigation service supported by a TPS. During step 700 the GNSS component 132 acquires requirements and status information potentially bearing upon selection of a GNSS signal source from multiple supported sources.

During step 710 the GNSS component 132 forwards to the GNSS control center 109, via the telematics unit 114, the GNSS requirements and status information acquired during step 700. See FIGS. 3 and 4, described herein above.

The GNSS component 132 is further configured to receive, during step 720, a GNSS type selection notification message from the GNSS control center 109. Such notification is, by way of example, of the type summarized in FIG. 6 and is received via a mobile wireless network connection. In the illustrative example provided in FIG. 2, such notification is received by the mobile wireless component 124. The GNSS type selection notification message is generated by the GNSS type configuration manager 330 based upon information provided by the telematics unit 114 (during step 710) and from GNSS signal sources (e.g. GNSS constellations) of the types summarized in FIGS. 4 and 5 respectively.

During step 730, the GNSS component 132 processes the GNSS type selection notification message to render/issue control instructions to GNSS type-specific components within the GNSS component 132 incorporated into the telematics unit 114. In the illustrative example in FIG. 2, during step 730 the GNSS type selection notification message information is passed to the GNSS type selection logic 240. The GNSS type selection logic 240 issues control instructions to the positioning engine 230 and the GNSS Resource Allocation module 250 causing the GNSS component 132 to operate in accordance with a particular GNSS type (e.g., GPS, GLONASS, etc.).

It will thus be appreciated that the described system and method allows for reliable over-the-air GNSS type-specific configuration of GNSS components incorporated within telematics units including mobile wireless connectivity to a GNSS control center. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for over-the-air configuration of a Global Navigation Satellite System (GNSS) receiver incorporated into a telematics unit, the method comprising:
    acquiring, by the GNSS receiver, GNSS requirements and status information for each one of multiple GNSS signal sources supported by the GNSS receiver;
    forwarding, by the GNSS receiver to a GNSS control center, the GNSS requirements and status information;
    receiving, by the GNSS receiver, in response to the forwarding the GNSS requirements and status information, a GNSS type selection notification message from the GNSS control center; and
    applying, by the GNSS receiver, information contained within the GNSS type selection notification to configure GNSS type-specific components within the GNSS receiver to cause the GNSS receiver to operate according to a particular GNSS signal type mode of multiple supported GNSS signal type modes corresponding to the multiple GNSS signal sources.

2. The method of claim 1 wherein the GNSS requirements and status information comprises a minimum GNSS signal position accuracy.

3. The method of claim 1 wherein the GNSS requirements and status information comprises a region of operation of the GNSS receiver.

4. The method of claim 1 wherein the GNSS requirements and status information comprises an environment type.

5. The method of claim 1 wherein the GNSS requirements and status information comprises a vehicle operating mode.

6. The method of claim 1 wherein the GNSS requirements and status information comprises GNSS receiver system capabilities.

7. The method of claim 1 wherein the GNSS requirements and status information comprises GNSS signal observation anomalies relating to various ones of GNSS signal types currently sensed by the GNSS receiver.

8. The method of claim 1 wherein the GNSS receiver:
    polls multiple supported GNSS signal sources to determine signal strength/quality, and
    reports the signal strength/quality in the GNSS requirements and status information to the GNSS control center.

9. The method of claim 1 wherein the GNSS signal sources include at least a global constellation.

10. The method of claim 9 wherein the GNSS signal sources include at least a regional signal source.

11. The method of claim 1 wherein the information contained within the GNSS type selection notification message includes a selected GNSS signal source.

12. The method of claim 11 wherein the information contained within the GNSS type selection notification message includes a selected GNSS signal.

13. The method of claim 11 wherein the information contained within the GNSS type selection notification message specifies GNSS receiver resources.

14. The method of claim 11 wherein the information contained within the GNSS type selection notification message includes correction instructions.

15. The method of claim 11 wherein the information contained within the GNSS type selection notification message includes measurement selection and relative weights.

16. The method of claim 11 wherein the information contained within the GNSS type selection notification message includes a filtering mode.

17. The method of claim 1 wherein the forwarding and receiving are carried out, between the GNSS receiver and a GNSS control center, via mobile wireless communications carried out by a telematics unit incorporating the GNSS receiver.

18. A telematics unit including:
an antenna configured to receive Global Navigation Satellite System (GNSS) signals from GNSS signal sources; and
a GNSS receiver supporting over-the-air configuration, wherein the telematics unit is configured with a processor and a non-transitory computer-readable medium including computer-executable instructions for carrying out the steps of:
   acquiring, by the GNSS receiver, GNSS requirements and status information for each one of multiple GNSS signal sources supported by the GNSS receiver;
   forwarding, by the GNSS receiver to a GNSS control center, the GNSS requirements and status information;
   receiving, by the GNSS receiver, in response to the forwarding the GNSS requirements and status information, a GNSS type selection notification message from the GNSS control center; and
   applying, by the GNSS receiver, information contained within the GNSS type selection notification to configure GNSS type-specific components within the GNSS receiver to cause the GNSS receiver to operate according to a particular GNSS signal type mode of multiple supported GNSS signal type modes corresponding to the multiple GNSS signal sources.

19. The telematics unit of claim 18 further including a mobile wireless communications interface for communicating with a GNSS control center during the forwarding and receiving.

20. A non-transitory computer readable medium including computer-executable instructions for a telematics unit carrying out over-the-air configuration of a Global Navigation Satellite System (GNSS) receiver incorporated into a telematics unit by performing a method comprising:
   acquiring, by the GNSS receiver, GNSS requirements and status information for each one of multiple GNSS signal sources supported by the GNSS receiver;
   forwarding, by the GNSS receiver to a GNSS control center, the GNSS requirements and status information;
   receiving, by the GNSS receiver, in response to the forwarding the GNSS requirements and status information, a GNSS type selection notification message from the GNSS control center; and
   applying, by the GNSS receiver, information contained within the GNSS type selection notification to configure GNSS type-specific components within the GNSS receiver to cause the GNSS receiver to operate according to a particular GNSS signal type mode of multiple supported GNSS signal type modes corresponding to the multiple GNSS signal sources.

* * * * *